(12) United States Patent
Soda

(10) Patent No.: US 9,210,286 B2
(45) Date of Patent: Dec. 8, 2015

(54) PRINTING APPARATUS CAPABLE OF REDUCING TIME REQUIRED FOR CONTINUOUS PRINTING AND PRINTING CONTROL METHOD

(71) Applicant: CANON KABUSHIKI KAISHA, Tokyo (JP)

(72) Inventor: Yuji Soda, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/593,550

(22) Filed: Jan. 9, 2015

(65) Prior Publication Data

US 2015/0207951 A1 Jul. 23, 2015

(30) Foreign Application Priority Data

Jan. 17, 2014 (JP) .................................. 2014-006686

(51) Int. Cl.
*H04N 1/00* (2006.01)
*G03G 21/20* (2006.01)
*G03G 15/20* (2006.01)

(52) U.S. Cl.
CPC ....... *H04N 1/00978* (2013.01); *G03G 15/2003* (2013.01); *G03G 21/20* (2013.01); *H04N 1/0005* (2013.01); *H04N 1/00015* (2013.01); *H04N 1/00037* (2013.01); *H04N 1/00055* (2013.01); *H04N 1/00082* (2013.01); *H04N 1/00644* (2013.01); *G03G 2215/00084* (2013.01)

(58) Field of Classification Search
None
See application file for complete search history.

(56) References Cited

U.S. PATENT DOCUMENTS

| | | | | |
|---|---|---|---|---|
| 5,768,654 A | * | 6/1998 | Noguchi et al. | 399/69 |
| 6,163,662 A | * | 12/2000 | Martin et al. | 399/45 |
| 6,836,626 B2 | * | 12/2004 | Hooper et al. | 399/69 |
| 7,650,092 B2 | * | 1/2010 | Oyumi | 399/38 |
| 8,699,897 B2 | * | 4/2014 | Soda | 399/44 |
| 2003/0235421 A1 | | 12/2003 | Hooper et al. | |
| 2012/0134692 A1 | * | 5/2012 | Soda | 399/44 |

FOREIGN PATENT DOCUMENTS

JP 2004029809 A 1/2004

\* cited by examiner

*Primary Examiner* — Paul F Payer
(74) *Attorney, Agent, or Firm* — Rossi, Kimms & McDowell LLP

(57) ABSTRACT

A technique which enables reduction of time required for continuous printing performed by an image forming apparatus in a temperature rise suppression mode. A printer prints a plurality of pages based on print data received from a host computer. A temperature sensor detects internal temperature of the printer. A control unit controls the printer such that the printing is suspended when the internal temperature has risen to a shifting temperature, and the printing is restarted when the internal temperature has fallen to a normal restart threshold value during the suspension of the printing. The control unit calculates the number of remaining pages left unprinted when the printing is suspended, and sets the normal restart threshold value according to the calculated number of the remaining pages.

8 Claims, 6 Drawing Sheets

PRINTING APPARATUS CAPABLE OF REDUCING TIME REQUIRED FOR CONTINUOUS PRINTING AND PRINTING CONTROL METHOD

BACKGROUND OF THE INVENTION

1. Field of the Invention

The present invention relates to a printing apparatus, such as a copying machine or a printer, and a printing control method, and more particularly to a printing control technique employed by the printing apparatus.

2. Description of the Related Art

In recent years, price reduction of an image forming apparatus (printing apparatus), such as a copying machine or a printer, is under way, and therefore it is desired to reduce the cost of a controller for controlling the operation of the image forming apparatus. For example, when a host-based printer that prints print data received from a host computer is used, printer cost is reduced by transmitting data, which is rasterized by the host computer into a form that can be output by the printer, to the printer for printing.

Further, printers of the above-mentioned type include one which is reduced in size and manufacturing cost by dispensing with a cooling unit, such as a fan. The printer without a cooling unit employs a control method in which a predetermined cooling time period is set when the internal temperature rises such that a printing operation is inhibited from being performed before the internal temperature of the printer falls to a predetermined temperature (this control mode will be hereinafter referred to as "the temperature rise suppression mode"). As a printing control method in the temperature rise suppression mode, there has been proposed, for example, a method in which image data analysis is performed on at least a portion of image data of a print job to thereby determine image density thereof and the temperature of a fixing device as a heating element is controlled based on the determined image density (see Japanese Patent Laid-Open Publication No. 2004-29809).

In the printer without a cooling unit, however, if continuous printing is performed based on a print job, the internal temperature is sometimes increased in a short time, which causes the printer to shift to the temperature rise suppression mode. When the printer shifts to the temperature rise suppression mode, printing operation cannot be restarted until the internal temperature falls to the predetermined temperature, and therefore a user has to wait for a long time before the print job is terminated. Particularly when printing operation is stopped with a few remaining printing sheets, the user finds it inconvenient to use the printer.

However, if the predetermined temperature at which the printing operation is permitted to be restarted is set to a high temperature so as to restart the printing operation earlier, stoppage and restart of printing operation occur frequently. In this case, the user also finds it inconvenient to use the printer, and it cannot be said that the printer is user-friendly.

SUMMARY OF THE INVENTION

The present invention provides a technique which makes it possible to reduce time required for continuous printing performed by an image forming apparatus in a temperature rise suppression mode.

In a first aspect of the present invention, there is provided a printing apparatus comprising a printing unit configured to perform printing of a plurality of pages based on print data received from an external apparatus, a detection unit configured to detect temperature of a predetermined internal location of the printing apparatus, and a control unit configured to control the printing unit such that the printing is suspended on condition that the temperature detected by the detection unit has risen to a first temperature, and the printing is restarted on condition that the temperature detected by the detection unit has fallen to a second temperature set lower than the first temperature during the suspension of the printing, wherein the control unit calculates a number of remaining pages left unprinted when the printing is suspended on condition that the temperature has risen to the first temperature, and sets the second temperature according to the calculated number of the remaining pages.

In a second aspect of the present invention, there is provided a method of controlling a printing apparatus, comprising printing a plurality of pages based on print data received from an external apparatus, detecting temperature of a predetermined internal location of the printing apparatus, and controlling said printing such that said printing is suspended on condition that the temperature detected by said detecting has risen to a first temperature, and said printing is restarted on condition that the temperature detected by said detecting has fallen to a second temperature set lower than the first temperature during the suspension of said printing, wherein said controlling includes calculating a number of remaining pages left unprinted when said printing is suspended on condition that the temperature has risen to the first temperature, and setting the second temperature according to the calculated number of the remaining pages.

According to the present invention, it is possible to reduce time required for continuous printing performed by the image forming apparatus in the temperature rise suppression mode. This makes it possible not only to improve the user-friendliness of the printing apparatus, but also to reduce power consumption thereby.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof. In the present embodiment, a printer configured to perform printing on a sheet using toner (i.e. a so-called laser beam printer) will be described as a printing apparatus according to the present embodiment. However, this is not limitative, but the printing apparatus of the present invention may be a copying machine, a multifunction peripheral (MFP) which is further provided with a copy function and a facsimile function, or the like.

Figure 1:
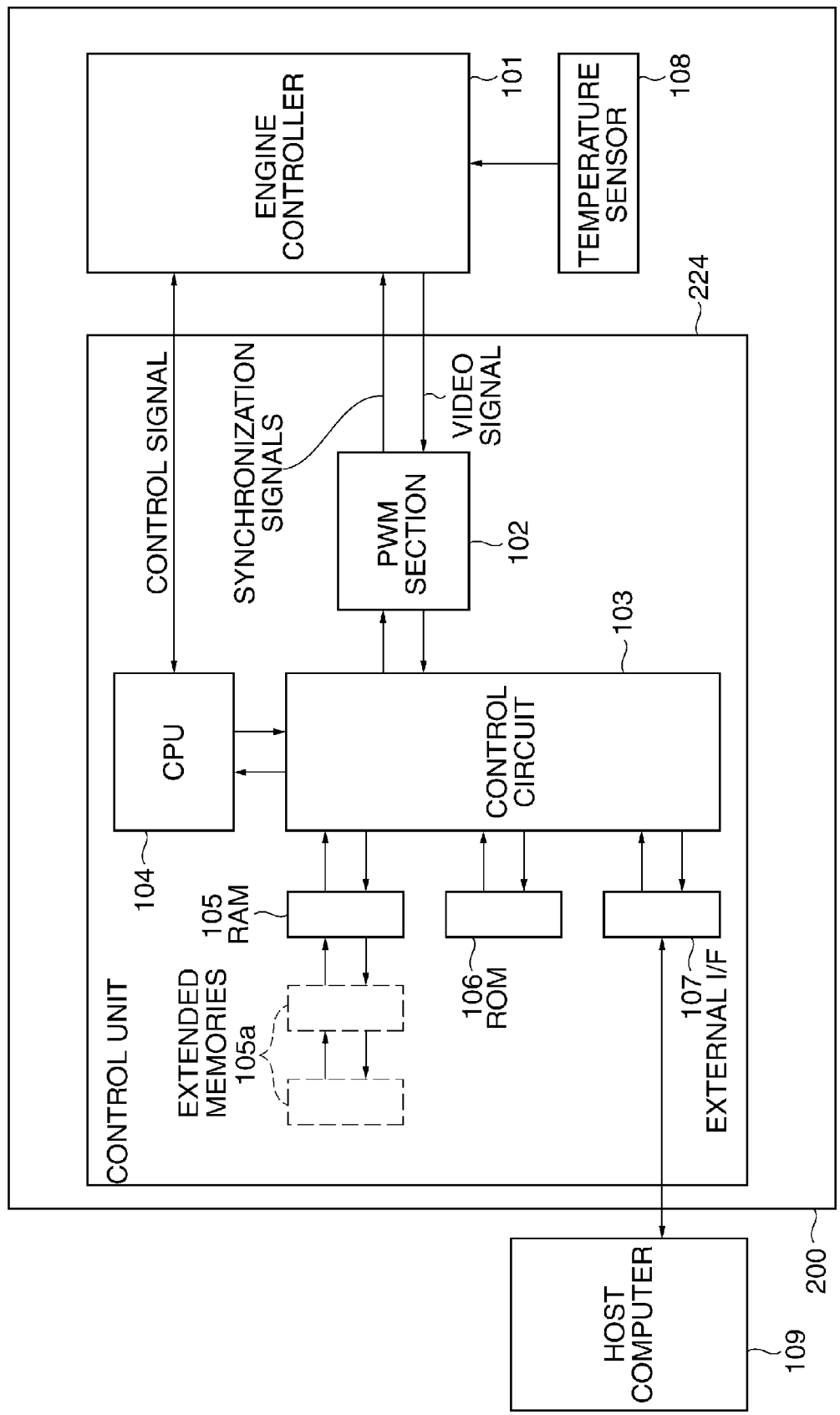
FIG. 1 is a schematic block diagram of a printer as a printing apparatus according to an embodiment of the present invention.

FIG. 1 is a schematic block diagram of the printer 200 according to the embodiment of the present invention. The printer 200 prints print data (image data) received from each of various external apparatuses, such as a host computer 109, to form an image on a recording medium, such as a sheet, using toner.

The printer 200 includes a PWM section 102, a control circuit 103, a CPU 104, a RAM 105, a ROM 106, and an external interface 107, which constitute a control unit 224. Further, the printer 200 includes an engine controller 101 and a temperature sensor 108.

The ROM 106 stores control programs, variables, etc. for controlling various operations performed by the printer 200. The CPU 104 executes the various control programs stored in the ROM 106, to thereby control the overall operation of the printer 200. The RAM 105 temporarily stores print data received from an external apparatus, such as the host computer 109. Further, the RAM 105 functions as a work memory which provides a work area used by the CPU 104 for loading and executing the various control programs read from the ROM 106. Note that it is possible to extend the storage capacity of the RAM 105 using extended memories 105a.

The engine controller 101 controls sheet conveyance and the like. In the printer 200, if heating elements, such as fixing rollers 217a and 217b (see FIG. 2), cause the internal temperature to sharply rise to exceed a predetermined temperature mainly during continuous printing, it becomes impossible to perform normal printing. To avoid this, the temperature sensor 108 measures the internal temperature of the printer 200 and transmits information on the measured internal temperature to the engine controller 101 to make it possible to perform printing within a temperature range ensuring a normal printing operation. The engine controller 101 monitors the internal temperature of the printer 200 based on the information on the internal temperature measured i.e. detected by the temperature sensor 108.

The PWM section 102 performs correction and other processing of each of various images and transmits corrected video data of the corrected image to the engine controller 101. The control circuit 103 exchanges data with the CPU 104, the ROM 106, and the RAM 105, as well as controls transmission of image data to the engine controller 101. The external interface 107 not only exchanges control signals with the host computer 109, but also receives image data and the like. Note that the printer 200 is set as a host-based machine. Therefore, the amount of toner to be used for printing on each sheet by the printer 200 is calculated by the host computer 109, and is notified to the printer 200.

The host computer 109 not only transmits print data to the printer 200, but also acquires information indicative of operating conditions, etc. of the printer 200 (i.e. printer information) from the printer 200, and displays the printer information on a monitor, not shown, for a user.

Figure 2:
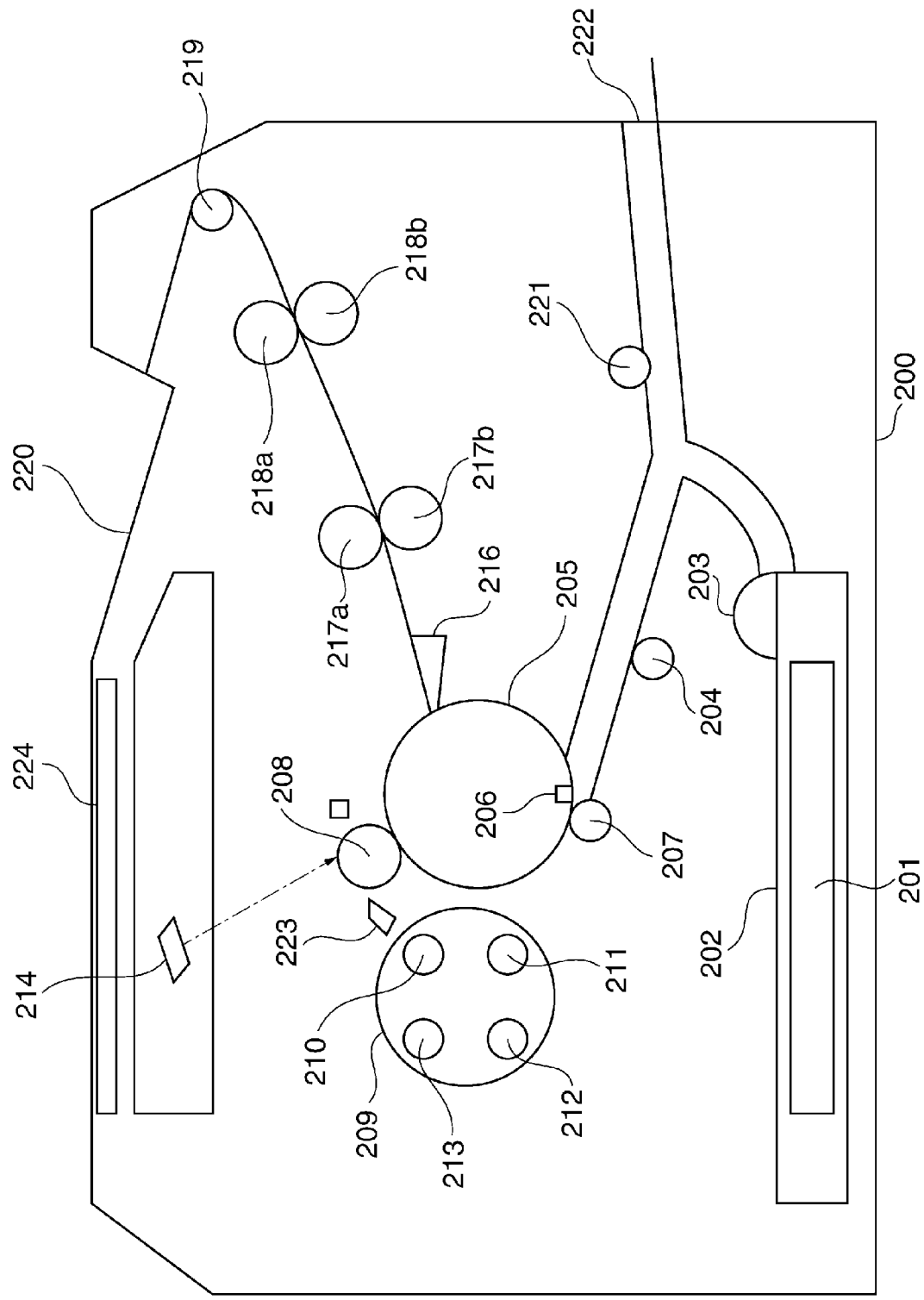
FIG. 2 is a schematic cross-sectional view of the printer shown in FIG. 1.

FIG. 2 is a schematic cross-sectional view of the printer 200. In the printer 200, sheets 201 as recording media are accommodated in a sheet cassette 202. Only an uppermost one of the sheets 201 accommodated in the sheet cassette 202 is separated by a cassette sheet feed clutch 203. The sheet separated by the cassette sheet feed clutch 203 is conveyed by the same until the leading end of the sheet reaches a sheet feed roller 204. More specifically, the cassette sheet feed clutch 203 has a cam shape and is rotated by a drive unit, not shown, for each sheet feed operation to thereby convey a sheet separated by the cassette sheet feed clutch 203 itself until the leading end of the sheet reaches the sheet feed roller 204. The cassette sheet feed clutch 203 conveys one sheet per one turn.

Note that the printer 200 is provided with a sheet table 222 and a manual sheet feed clutch 221 such that it is capable of performing manual sheet feed from the sheet table 222, in addition to (automatic) sheet feed from the above-mentioned sheet cassette 202.

When the sheet reaches the sheet feed roller 204, the sheet feed roller 204 performs rotation while slightly pressing the sheet, to thereby convey the same. During printing, a transfer drum 205 rotates at a predetermined speed. When the transfer drum 205 rotates and a gripper 206 on the transfer drum 205 reaches a position that faces the leading end of the sheet, the gripper 206 holds the leading end of the sheet, and then the sheet is wound around the transfer drum 205 in accordance with the rotation of a conveying roller 207 to be further conveyed.

The printer 200 performs printing on a sheet by an electrophotographic method, using four color toners. The printer 200 is provided with four color toner developing devices, i.e. a yellow (Y) toner developing device 210, a magenta (M) toner developing device 211, a cyan (C) toner developing device 212, and a black (K) toner developing device 213. The four color toner developing devices are held on a developing device support 209, and rotation of the developing device support 209 causes a toner developing device of a desired color to be positioned at a location where development can be performed on a photosensitive drum 208.

On the other hand, in the printer 200, a laser driver 214 scans the photosensitive drum 208 in the main scanning direction while turning a semiconductor laser, not shown, on and off, according to dot data delivered from the control unit 224, to thereby form a latent image along a main scanning line. In other words, on the photosensitive drum 208, which is charged by an electrostatic charger, not shown, a latent image for one page is formed by exposure to a laser beam. At this time, the photosensitive drum 208 is driven for rotation such that formation of the latent image and a sheet position on the transfer drum 205 are synchronized.

Note that the amount of toner applied to the photosensitive drum 208 for development changes e.g. due to replacement of each of the toner developing devices of the respective colors or the photosensitive drum 208 or varies with change in ambient temperature and humidity. For this reason, in the printer 200, a density sensor 223 detects the densities of toner images of the respective colors formed on the photosensitive drum 208 at predetermined timing. The CPU 104 of the control unit 224 is capable of performing calibration for determining a correlation between digital pixel values and actual toner application amounts, and performs correction for determining an appropriate toner application amount based on the result of the calibration.

A latent image on the photosensitive drum 208 is developed into a toner image by a toner developing device of a predetermined color selected from the four color toner developing devices. The toner image is transferred onto a sheet on the transfer drum 205, and this operation is repeatedly carried out by a number of times corresponding to the number of toners of required colors, whereby toner images are superimposed on the sheet on the transfer drum 205.

The sheet having the required toner images transferred thereon is separated from the transfer drum 205 by a transfer separation pawl 216, and is conveyed in a state nipped by a pair of fixing rollers 217a and 217b. During this conveyance by the fixing roller pair, the toner images are thermally fixed on the sheet. The sheet having the toner images fixed thereon is further conveyed by conveying rollers 218a and 218b and a conveying roller 219, and is discharged onto a discharge tray 220.

Figure 3:
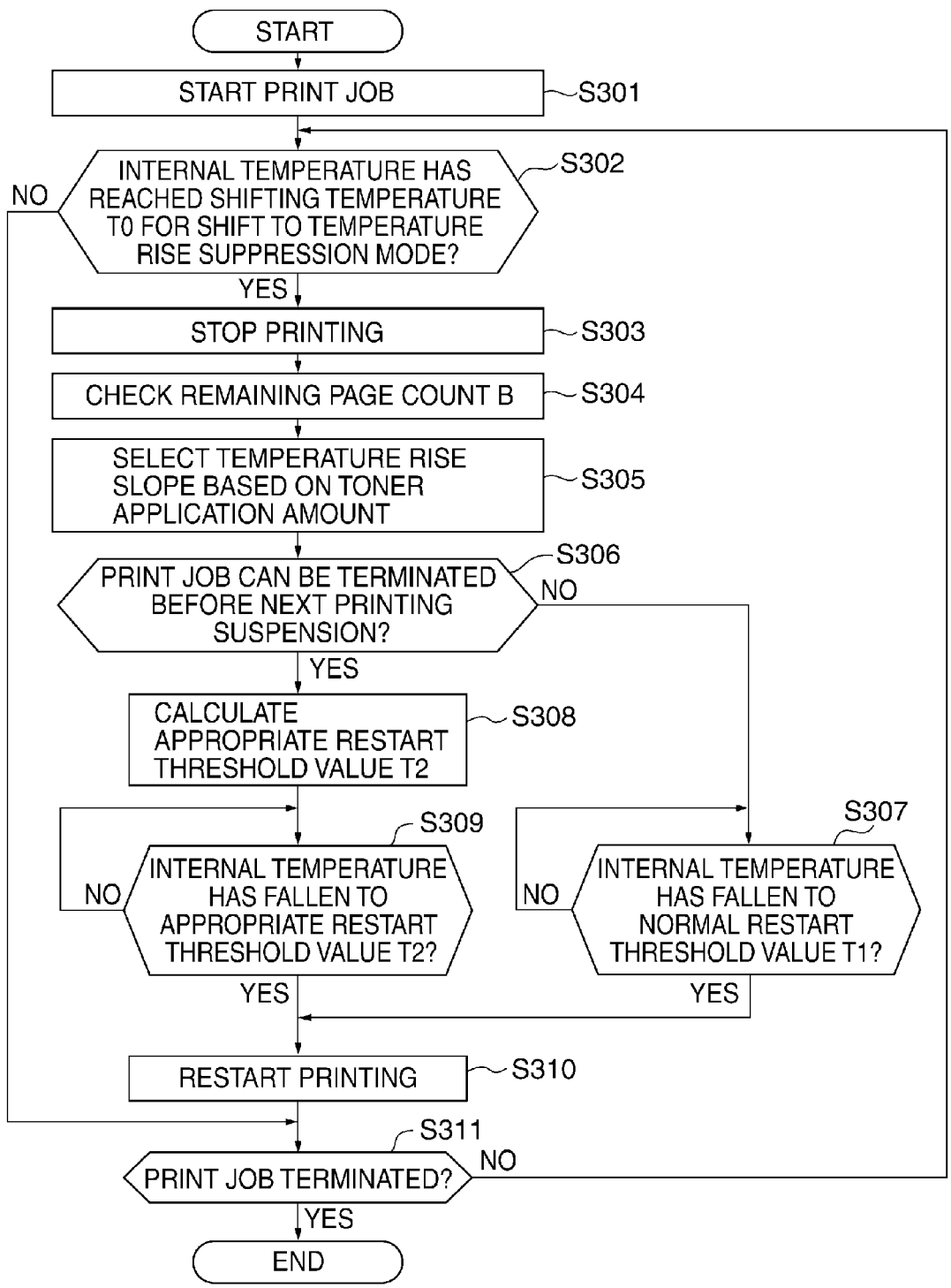
FIG. 3 is a flowchart of a printing process performed by the printer shown in FIG. 1.

FIG. 3 is a flowchart of a printing process (printing control method) performed by the printer 200. Processing steps shown in the FIG. 3 flowchart are performed by the CPU 104, which loads various programs (firmware) stored in the ROM 106 into the RAM 105 and executes them.

When the external interface 107 receives a control signal requesting execution of a print job from the host computer 109, the control signal is transferred to the CPU 104, and the CPU 104 transmits a printing start signal to the engine controller 101. Thus, the print job is started in a step S301.

Upon receipt of the printing start signal, the engine controller 101 outputs a main-scanning synchronization signal and a sub-scanning synchronization signal, and an image signal is output from the PWM section 102 according to the synchronization signals. In the host computer 109, image data of an output image is formed, and a maximum toner application amount is calculated based on the digital values of the output image. The calculated maximum toner application amount is delivered as image information to the CPU 104 via the external interface 107 and the control circuit 103. The CPU 104 delivers the acquired maximum toner application amount to the engine controller 101, and the engine controller 101 controls the temperature of the fixing rollers 217a and 217b based on the received maximum toner application amount.

By the way, the temperature sensor 108 connected to the engine controller 101 always monitors the internal temperature of the printer 200, so that the CPU 104 can acquire internal temperature information via the engine controller 101. Therefore, in a step S302, the CPU 104 determines whether or not the internal temperature of the printer 200 has reached a mode shifting temperature T0 for causing the printer 200 to shift to a predetermined temperature rise suppression mode (hereinafter simply referred to as "the shifting temperature T0") (first temperature). Note that the shifting temperature T0 is an upper limit value of an internal temperature range within which the printer 200 can normally perform a printing operation.

If the internal temperature has reached the shifting temperature T0 (YES to the step S302), the process proceeds to a step S303, whereas if the internal temperature has not reached the shifting temperature T0 (NO to the step S302), the process proceeds to a step S311.

Figure 4:
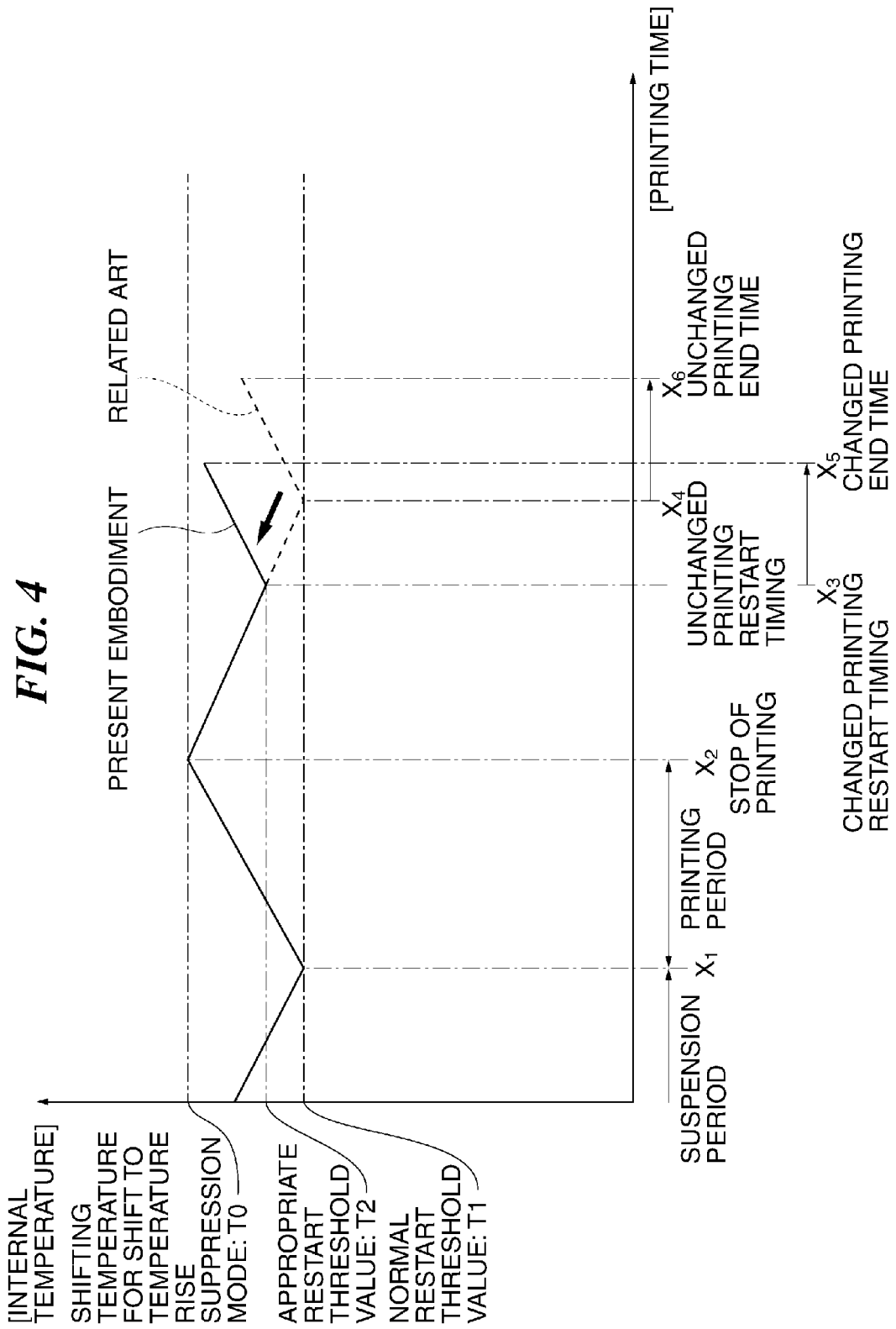
FIG. 4 is a chart useful in explaining the relationship between internal temperature, printing stoppage, and printing restart in a temperature rise suppression mode of the printer shown in FIG. 1.

In the step S303, the CPU 104 stops the printing operation. FIG. 4 is a chart useful in explaining the relationship between internal temperature, printing stoppage, and printing restart, in the temperature rise suppression mode of the printer 200. When the internal temperature reaches the shifting temperature T0, printing operation is stopped (printing stoppage). FIG. 4 shows changes in the internal temperature, which occurs from when a certain time period has elapsed after the time point of printing stoppage. In FIG. 4, the printing operation is restarted at a time point $x_1$ when the internal temperature falls to a predetermined temperature, which is a normal temperature for restarting printing (hereinafter referred to as "the normal restart threshold value T1") (second temperature).

After the stoppage of the printing operation in the step S303, the CPU 104 checks, in the following step S304, a remaining page count (the number of pages left unprinted) B for the print job. Here in the step S304, it is assumed that the amount of toner to be applied to each sheet has been calculated by the host computer 109 and sent to the printer 200 as described hereinbefore. Therefore, in a step S305, based on the toner application amount calculated on each of the remaining pages of the remaining page count B of the print job at the time point when the printing operation was stopped, the CPU 104 selects a temperature rise slope from a table in which the relationship between toner application amounts and temperature rise slopes is univocally defined in advance. Note that this table is stored in the ROM 106 or the RAM 105.

Then, in a step S306, the CPU 104 calculates, based on the temperature rise slope selected in the step S305, the number of pages that can be printed until a next printing stoppage, and determines whether or not the calculated number of pages is enough to complete the remainder of the print job. Specifically, it is determined whether or not the remaining page count B of the print job at the time point when the printing operation was stopped is smaller than a printable page count A indicative of the number of pages that can be printed within a time period between a time point when the internal temperature falls to the normal restart threshold value T1 at which the printing operation is to be restarted and a time point when the internal temperature reaches the shifting temperature T0 next time. This determination will be described with reference to FIG. 5.

Figure 5:
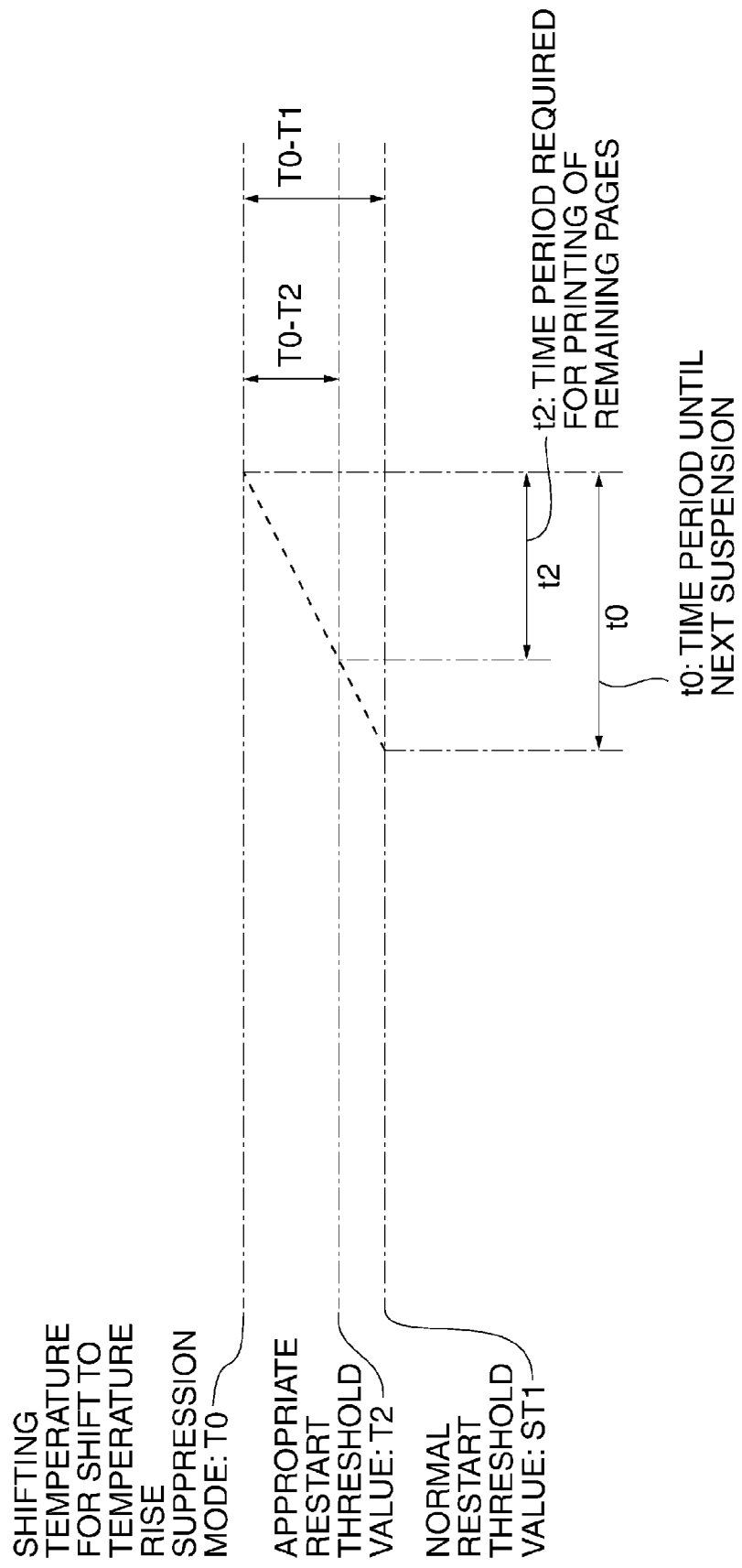
FIG. 5 is a diagram useful in explaining a method of determining an appropriate restart threshold value appearing in FIG. 4.

FIG. 5 is a diagram useful in explaining a method of determining, based on a temperature rise slope, an appropriate temperature for restarting a print job (hereinafter referred to as "the appropriate restart threshold value T2") (third temperature). The printable page count A is indicative of the number of pages that can be printed within a time period t0 from a time point when a print job is restarted at the normal restart threshold value T1 to a time point when the internal temperature reaches the shifting temperature T0. The printable page count A can be calculated based on the time period t0 and engine speed of a printing operation. In the present example, since the temperature rise slope was selected in the step S305, it is possible to calculate the time period t0 based on the selected temperature rise slope, the shifting temperature T0, and the normal restart threshold value T1 (i.e. time period t0=(shifting temperature T0−normal restart threshold value T1)/selected temperature rise slope).

In a case where the remaining page count B of the print job is smaller than the printable page count A, even if the print job is restarted at the appropriate restart threshold value T2 without waiting for the internal temperature to fall down to the normal restart threshold value T1, it is possible to complete printing of pages of the remaining page count B before the internal temperature reaches the shifting temperature T0 next time.

The appropriate restart threshold value T2 can be calculated based on the remaining page count B of a print job, a time period t2 taken for the internal temperature to reach the shifting temperature T0, and the engine speed. More specifically, the time period t0 can be considered by replacing the same with the printable page count A, and the time period t2 can be considered by replacing the same with the remaining page count B, and therefore, the relationship between A (pages), B (pages), a temperature difference (T0−T1), and a temperature difference (T0−T2) is represented by "B/A=(T0−T2)/(T0−T1)", as can be understood from illustration of the relationship in FIG. 5. Therefore, the appropriate restart threshold value T2 can be determined as "T2=T0−B/A (T0−T1). At this time, a margin may be added to the remaining page count B so as to ensure more reliable completion of the print job.

In a case where the remaining page count B for the print job, which was checked in the step S304, is not larger than the printable page count A, particularly when the remaining page count B is larger than the printable page count A, even if the print job is restarted after the internal temperature falls to the normal restart threshold value T1, the internal temperature eventually reaches the shifting temperature T0 again. Therefore, if the remaining page count B is not smaller than the printable page count A (NO to the step S306), the process proceeds to a step S307, wherein the CPU 104 determines whether or not the internal temperature has fallen to the normal restart threshold value T1. If the CPU 104 determines that the internal temperature has not fallen to the normal restart threshold value T1 (NO to the step S307), the determination in the step S307 is repeated, and when the internal temperature falls to the normal restart threshold value T1 (YES to the step S307), the process proceeds to a step 310, wherein the CPU 104 restarts the printing operation.

On the other hand, if the remaining page count B is smaller than the printable page count A, i.e. if the printing job can be completed before next printing stoppage (YES to the step S306), the process proceeds to a step S308, wherein the CPU 104 calculates the appropriate restart threshold value T2, and then determines in a step S309 whether or not the internal temperature has fallen to the appropriate restart threshold value T2. If the internal temperature has not fallen to the appropriate restart threshold value T2 (NO to the step S309), the CPU 104 repeats the determination in the step S309, and when the internal temperature falls to the appropriate restart threshold value T2 (YES to the step S309), the process proceeds to the step S310, wherein the CPU 104 restarts the printing operation.

After the restart of the printing operation in the step S310, the CPU 104 determines in the step S311 whether or not the print job has been completed. If the print job has not been completed (NO to the step S311), the process returns to the step S302, whereas if the print job has been completed (YES to the step S311), the present process is terminated.

Now, a description will be given of the FIG. 4 chart by checking thereagainst the processing in the steps S302 to S311. At the time point $x_1$, the internal temperature has fallen to the normal restart threshold value T1. This indicates that the remaining page count B at a printing stoppage time immediately before the time point $x_1$ was larger than the printable page count A. After the printing operation (remainder of the print job) is restarted at the time point $x_1$, the internal temperature reaches the shifting temperature T0 at a time point $x_2$, and the printing operation is stopped again. The remaining page count B at the time point $x_2$ is smaller than the printable page count A. For this reason, the appropriate restart threshold value T2 is calculated, and then the printing operation is restarted at a time point $x_3$ when the internal temperature reaches the appropriate restart threshold value T2. The print job is terminated at a time point $x_5$ (present embodiment).

FIG. 4 indicates with broken lines temperature changes that occur when a conventional print job execution method (related art) is employed in which the appropriate restart threshold value T2 is not used. More specifically, when the appropriate restart threshold value T2 is not used, it is required to wait for the internal temperature to fall down to the normal restart threshold value T1, after the internal temperature reaches the shifting temperature T0 at the time point $x_2$, causing printing operation stoppage. Then, at a time point $x_4$ when the internal temperature reaches the normal restart threshold value T1, the printing operation is restarted, and at a time point $x_6$, the printing operation is terminated. As is apparent from FIG. 4, in the present embodiment, it is possible to terminate a print job earlier than in the related art by a time-difference period of $(x_6-x_4)$.

In the above-described embodiment, a temperature rise slope of the internal temperature of the printer 200 is selected from the table univocally defining the relationship between toner application amounts and temperature rise slopes, based on a toner application amount calculated on each of the remaining pages of the remaining page count B of a print job at a printing stoppage time. By the way, the value of temperature rise in the printer 200 tends to be influenced by an ambient temperature. Next, in view of this tendency, a description will be given of a process for calculating a more correct temperature rise slope by correcting the temperature rise slope based on a time period already spent in a print job in execution and the number of pages already used in the print job. When the FIG. 4 chart is taken as an example, correction information for correcting the temperature rise slope is calculated based on a time period from the time point $x_1$ when the printing operation was restarted to the time point $x_2$ when the printing operation was stopped and the number of pages printed within the time difference period of $(x_2-x_1)$.

Figure 6:
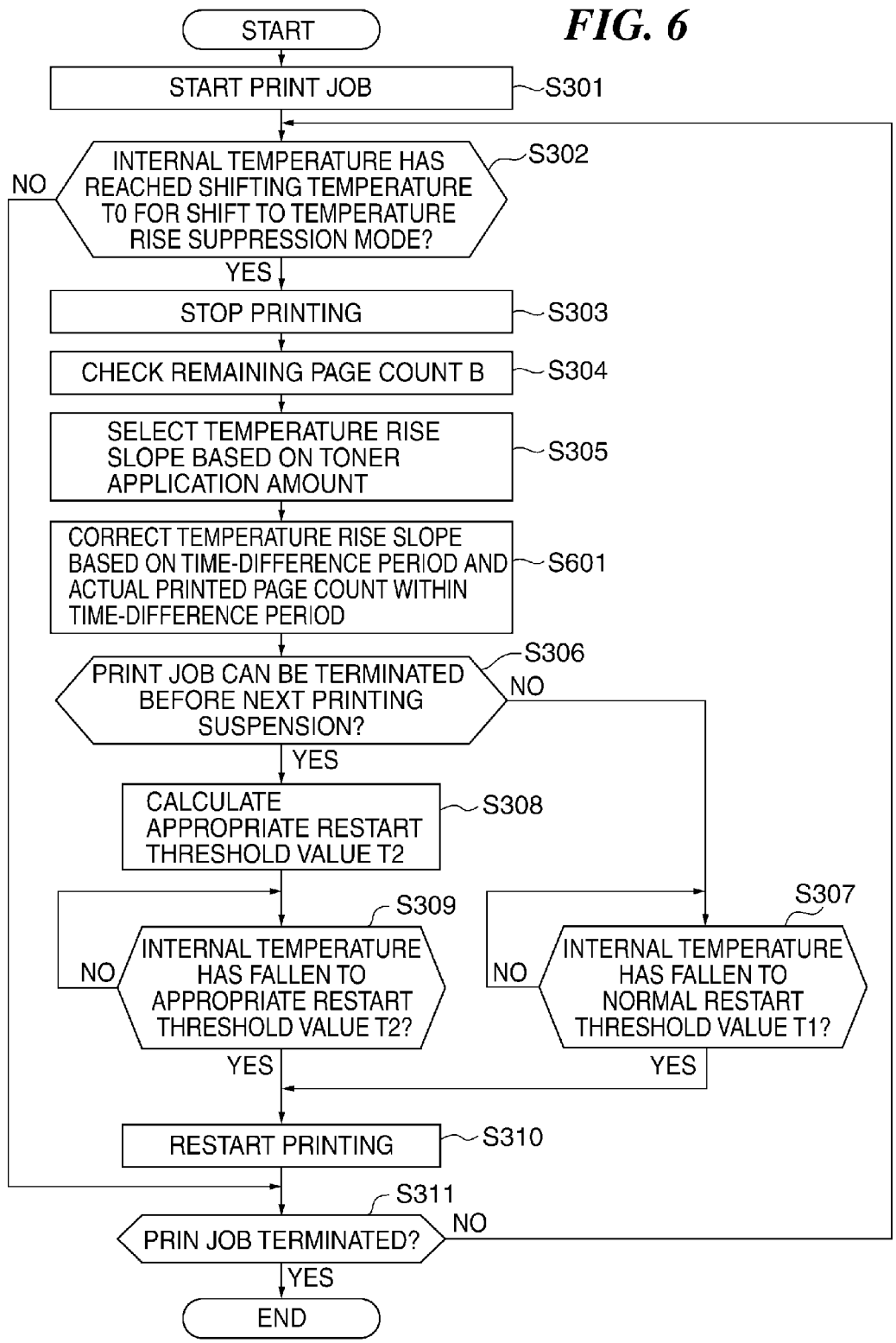
FIG. 6 is a flowchart of a variation of the printing process shown in FIG. 3, in which temperature rise slope correction processing is added.

FIG. 6 is a flowchart of a variation of the printing process shown in FIG. 3, performed by the printer 200, in which temperature rise slope correction processing is added. In the printing process in FIG. 6, the same steps as those in the printing process in FIG. 3 are denoted by the same step numbers.

Steps S301 to S305 in the printing process in FIG. 6 are the same as the steps S301 to S305 in the printing process in FIG. 3, and hence description thereof is omitted.

After a temperature rise slope is selected in the step S305, the CPU 104 performs the processing of a step S601. In the step S601, the CPU 104 corrects the temperature rise slope selected in the step S305, based on a time difference period between a time point when the printing operation was stopped and a time point when the same printing operation was started and the number of pages actually printed within the time difference period.

For example, in FIG. 4, at a time point, not shown, when the printing operation is stopped before the time point $x_1$, processing the steps S304 and S305 is performed, and the temperature rise slope to be applied after restart of the printing operation at the time point $x_1$ is selected from the table. Therefore, it is determined, based on a difference (e.g. ratio) between the selected temperature rise slope and an actual temperature rise slope within the time difference period of $(x_2-x_1)$, whether or not it is required to correct the temperature rise slope selected at the time point $x_2$, and if it is determined that the correction is required, the correction is performed.

Note that it is impossible to calculate correction information when the printing operation is stopped for the first time since a temperature rise slope to be formed within a time difference period between the start of a print job and the first stoppage of the same is not selected from the table. In this case, the temperature rise slope selected in the step S305 is used without being corrected in the step S601.

Steps S306 to S311 in the printing process in FIG. 6 are the same as the steps S306 to S311 in the printing process in FIG. 3, and therefore description thereof is omitted.

As described above, according to the present embodiment, a threshold value of temperature for restarting printing is changed based on a result of comparison between the number of pages which can be printed within a time period from restart of the printing operation to a next printing stoppage of the same and the number of remaining pages of the print job. This prevents the user from being caused to wait for the internal temperature to fall for an unnecessarily long time period, so that it is possible to terminate the print job earlier, which results in improvement of user's convenience.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2014-006686 filed Jan. 17, 2014 which is hereby incorporated by reference herein in its entirety.

What is claimed is:

1. A printing apparatus comprising:
a printing unit configured to perform printing of a plurality of pages based on print data received from an external apparatus;
a detection unit configured to detect temperature of a predetermined internal location of the printing apparatus; and
a control unit configured to control said printing unit such that the printing is suspended on condition that the temperature detected by said detection unit has risen to a first temperature, and the printing is restarted on condition that the temperature detected by said detection unit has fallen to a second temperature set lower than the first temperature during the suspension of the printing,
wherein said control unit calculates a number of remaining pages left unprinted when the printing is suspended on condition that the temperature has risen to the first temperature, and sets the second temperature according to the calculated number of the remaining pages.

2. The printing apparatus according to claim 1, wherein in the control for suspending the printing, said control unit calculates a number of pages that will be printed during a time period from the restart of the printing to a time point when the temperature detected by said detection unit rises up to the first temperature, and sets, in a case where the calculated number of the remaining pages is not smaller than the calculated number of the pages that will be printed, the second temperature to a predetermined temperature independent of the calculated number of the remaining pages, whereas sets, in a case where the calculated number of the remaining pages is smaller than the calculated number of the pages that will be printed, the second temperature to a temperature higher than the predetermined temperature and dependent on the calculated number of the remaining pages.

3. The printing apparatus according to claim 2, further comprising a storage unit configured to store a table defining a relationship between an amount of toner for use in printing pages and a temperature rise slope indicative of a slope of rise in the temperature detected by said detection unit, and
an acquisition unit configured to acquire the amount of toner for use in printing the pages from the external apparatus, and
wherein in the control for suspending the printing, said control unit calculates the amount of toner for use in printing the remaining pages left unprinted, based on the toner amount acquired by said acquisition unit, acquires a temperature rise slope from the table based on the calculated toner amount, and then calculates the number of the pages that will be printed, based on the first temperature, the predetermined temperature, and the acquired temperature rise slope.

4. The printing apparatus according to claim 3, wherein said control unit has a correction unit configured to correct the acquired temperature rise slope based on a time period required for the printing before the suspension and a number of pages completely printed before the suspension, and
wherein said control unit calculates the number of the pages that will be printed, based on the first temperature, the second temperature, and the temperature rise slope corrected by said correction unit.

5. A method of controlling a printing apparatus, comprising:
printing a plurality of pages based on print data received from an external apparatus;
detecting temperature of a predetermined internal location of the printing apparatus; and
controlling said printing such that said printing is suspended on condition that the temperature detected by said detecting has risen to a first temperature, and said printing is restarted on condition that the temperature detected by said detecting has fallen to a second temperature set lower than the first temperature during the suspension of said printing,
wherein said controlling includes calculating a number of remaining pages left unprinted when said printing is suspended on condition that the temperature has risen to the first temperature, and setting the second temperature according to the calculated number of the remaining pages.

6. The method according to claim 5, wherein in said controlling for suspending said printing, said controlling includes calculating a number of pages that will be printed during a time period from the restart of said printing to a time point when the temperature detected by said detecting rises up to the first temperature, and setting, in a case where the calculated number of the remaining pages is not smaller than the calculated number of the pages that will be printed, the second temperature to a predetermined temperature independent of the calculated number of the remaining pages, whereas setting, in a case where the calculated number of the remaining pages is smaller than the calculated number of the pages that will be printed, the second temperature to a temperature higher than the predetermined temperature and dependent on the calculated number of the remaining pages.

7. The method according to claim 6, further comprising storing a table defining a relationship between an amount of toner for use in printing pages and a temperature rise slope indicative of a slope of rise in the temperature detected by said detecting, and acquiring the amount of toner for use in printing the pages from the external apparatus, and wherein in said controlling for suspending said printing, said controlling includes calculating the amount of toner for use in printing the remaining pages left unprinted, based on the toner amount acquired by said acquiring, acquiring a temperature rise slope from the table based on the calculated toner amount, and then calculating the number of the pages that will be printed, based on the first temperature, the predetermined temperature, and the acquired temperature rise slope.

8. The method according to claim 7, wherein said controlling includes:

correcting the acquired temperature rise slope based on a time period required for the printing before the suspension and a number of pages completely printed before the suspension, and calculating the number of the pages that will be printed, based on the first temperature, the second temperature, and the temperature rise slope corrected by said correcting.

* * * * *